UNITED STATES PATENT OFFICE.

EDWARD W. DICKIE, OF CLYDE, NEW YORK.

COMPOSITION OF MATTER FOR PLASTERING.

SPECIFICATION forming part of Letters Patent No. 479,060, dated July 19, 1892.

Application filed February 23, 1892. Serial No. 422,451. (No specimens.)

*To all whom it may concern:*

Be it known that I, EDWARD W. DICKIE, a citizen of the United States, residing at Clyde, in the county of Wayne and State of New York, have invented a new and useful Composition of Matter to be used for Plastering the Interior Walls and Ceilings of Buildings, and which is also adapted to be molded into cornices and ornamental articles, which material possesses a sufficient degree of flexibility to render it more tenacious and durable and less liable to breakage and injury than the ordinary plaster hitherto used for such purposes.

My composition consists of the following ingredients in about the proportions hereinafter stated, viz: sand, eight hundred and fifty pounds; plaster-of-paris, three hundred pounds; shell marl, two hundred pounds; glue, one-half pound; alum, one-half pound; sulphate of zinc, one ounce; lime, forty pounds; cut rope or hair, one and one-half pounds. The glue, alum, and sulphate of zinc are intended as a restrainer to prevent the too-rapid setting of the compound. The said ingredients are to be mixed substantially in the following manner: The glue, alum, and zinc are first dissolved in water, after which they are mixed with about twenty pounds of lime and about twenty pounds of shell marl, the lime and marl having been first reduced to a powder. After having been so powdered the lime and marl are heated to about 120° Fahrenheit, after which the solution of glue, alum, and zinc is added and the mixture allowed to cool, and when cool the whole compound is to be thoroughly mixed together, when it is in a proper shape and condition for packing, storage, or transportation.

When it is to be used, the composition is to be mixed with sufficient water to render it plastic or of the required consistency for plastering with it the inside of buildings.

This compound is specially adapted for the first coat of plastering.

In preparing the second or finishing coat of plastering the cut rope or hair is omitted in the compound and the restrainer—to wit, the glue, alum, and sulphate of zinc—is used in slightly reduced quantities.

The composition described above is very cohesive and strong and finishes with a smooth hard surface, and is free from liability to crack or to break upon nails being driven into it.

I am aware that a composition of sand, lime, hair or cut rope, and glue has been used for the purpose aforesaid; but I am not aware that all of the ingredients of my composition in the proportions stated have been used together.

What I claim is—

The above-named composition of matter, consisting of sand, plaster-of-paris, shell marl, glue, alum, sulphate of zinc, lime, and cut rope or hair, combined in the manner and in about the proportions hereinbefore set forth.

In testimony whereof I have hereunto signed my name, in the presence of two witnesses, at Clyde, in the county of Wayne, in the State of New York, this 19th day of February, A. D. 1892.

EDWARD W. DICKIE.

Witnesses:
C. F. COTTON,
P. J. WELCH.